Jan. 17, 1961 T. P. FARKAS 2,968,347
FUEL CONTROL
Filed Sept. 21, 1956 4 Sheets-Sheet 1
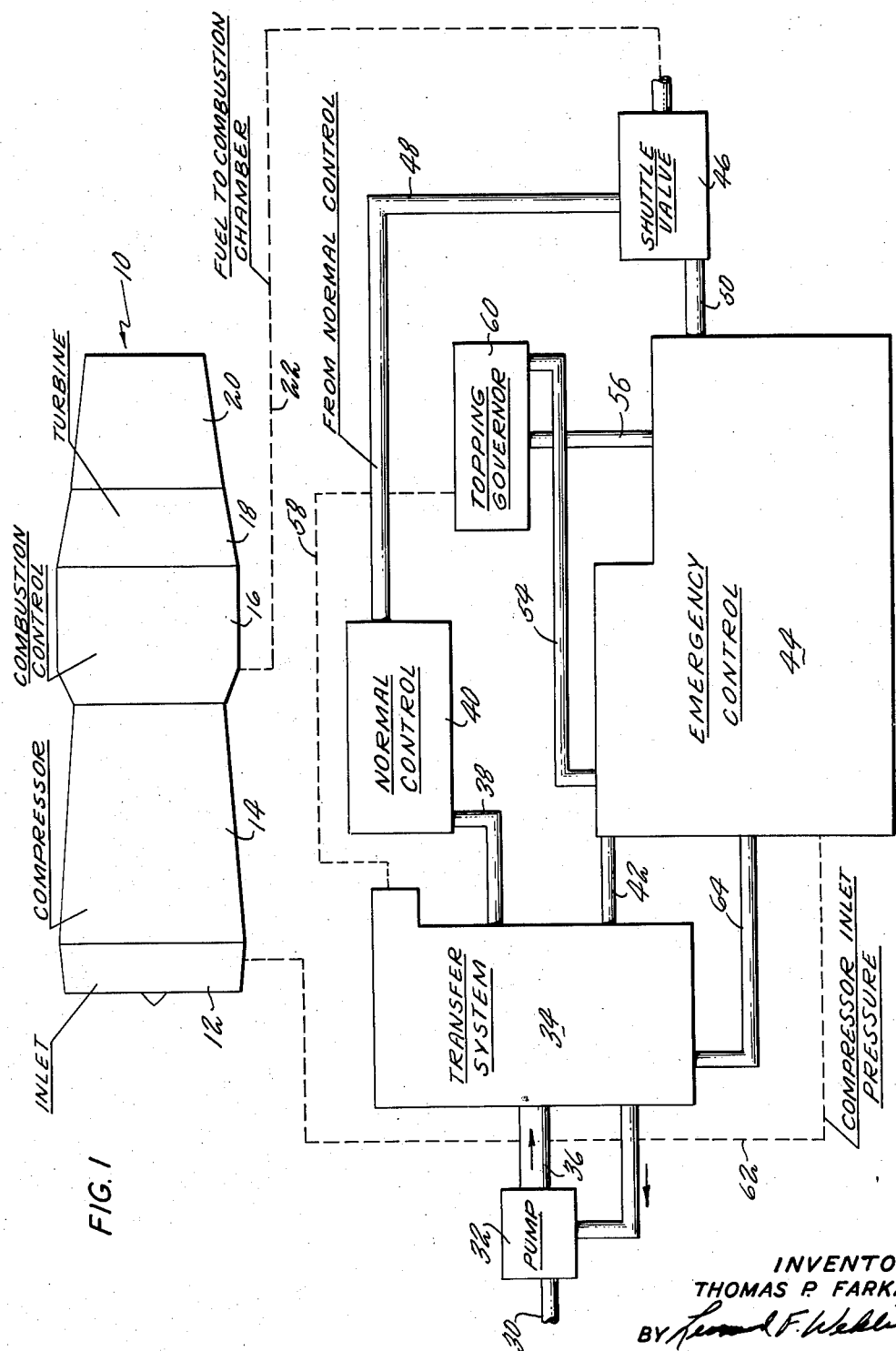
FIG. I
INVENTOR
THOMAS P. FARKAS
BY
ATTORNEY

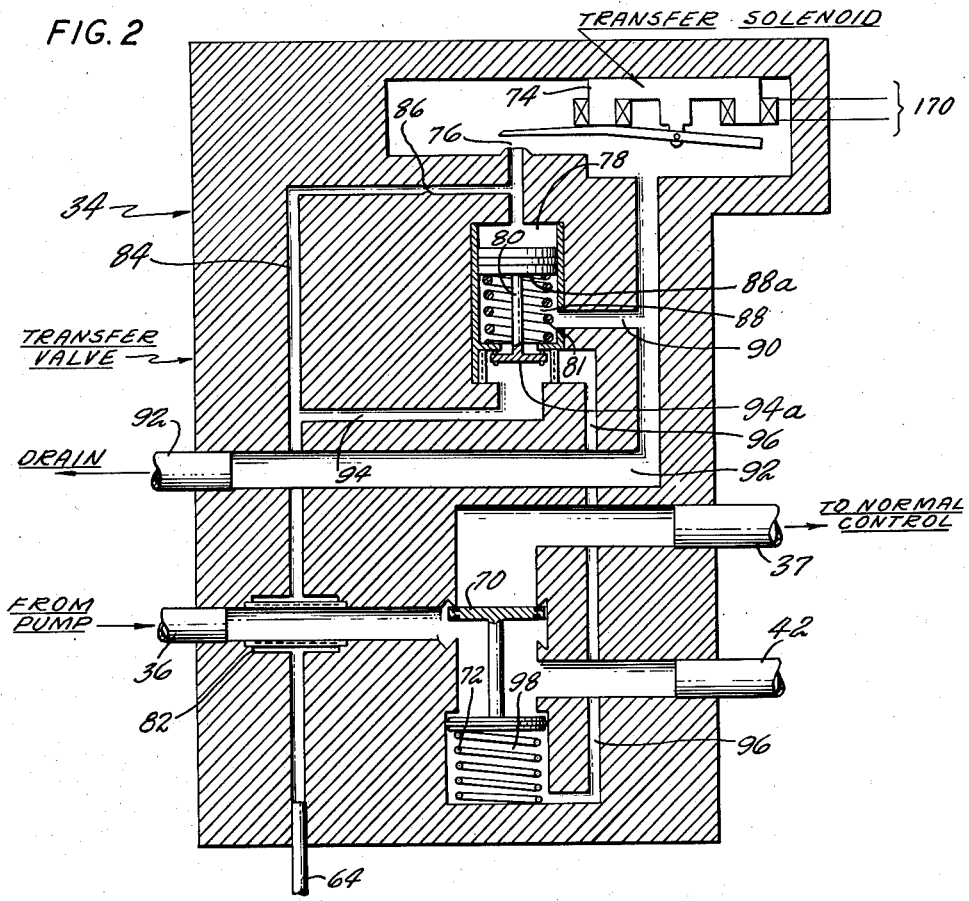
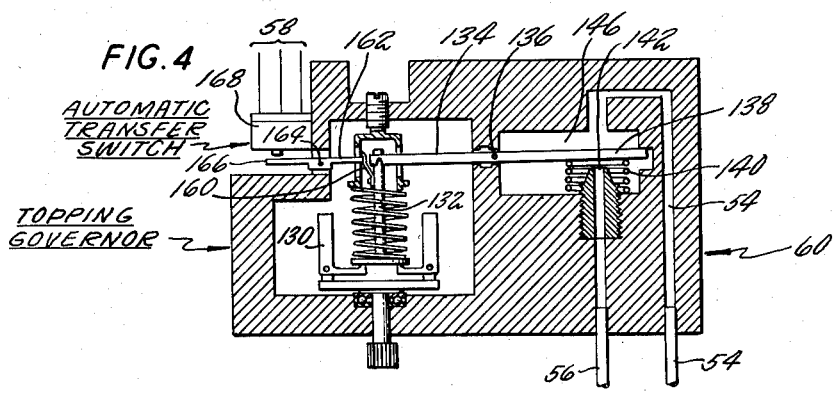

Jan. 17, 1961

T. P. FARKAS
FUEL CONTROL 2,968,347

Filed Sept. 21, 1956

INVENTOR
THOMAS P. FARKAS

BY
ATTORNEY

United States Patent Office 2,968,347
Patented Jan. 17, 1961

2,968,347
FUEL CONTROL

Thomas P. Farkas, Bloomfield, Conn., assignor to United Aircraft Corporation, East Hartford, Conn., a corporation of Delaware Filed Sept. 21, 1956, Ser. No. 611,337

4 Claims. (Cl. 158—36)

This invention relates to turbine type power plants and more particularly to fuel controls therefor.

It is an object of this invention to provide a fuel system with normal and emergency control units.

It is a further object of this invention to provide for an automatic switchover from normal control to the emergency system upon a predetermined decrease in power plant speed.

It is another object of this invention to provide an emergency fuel control system having certain novel features including a topping governor to reduce fuel flow with a predetermined excessive increase in power plant speed.

It is still another object of this invention to provide a means for varying the regulated pressure drop across the main throttle valve of the emergency control.

Another object of this invention is to provide a means for regulating the opening of a throttle valve by means of a servo system which moves at a predetermined rate in one direction and at a selected increased rate in the opposite direction.

These and other objects will become readily apparent from the following detailed description of the drawings in which:

Fig. 1 is a block diagram of the fuel control system of this invention.

Fig. 2 is a schematic illustration of the transfer system for transferring from normal to emergency control.

Fig. 4 is a schematic illustration of the topping governor and automatic transfer switch.

Figure 3:
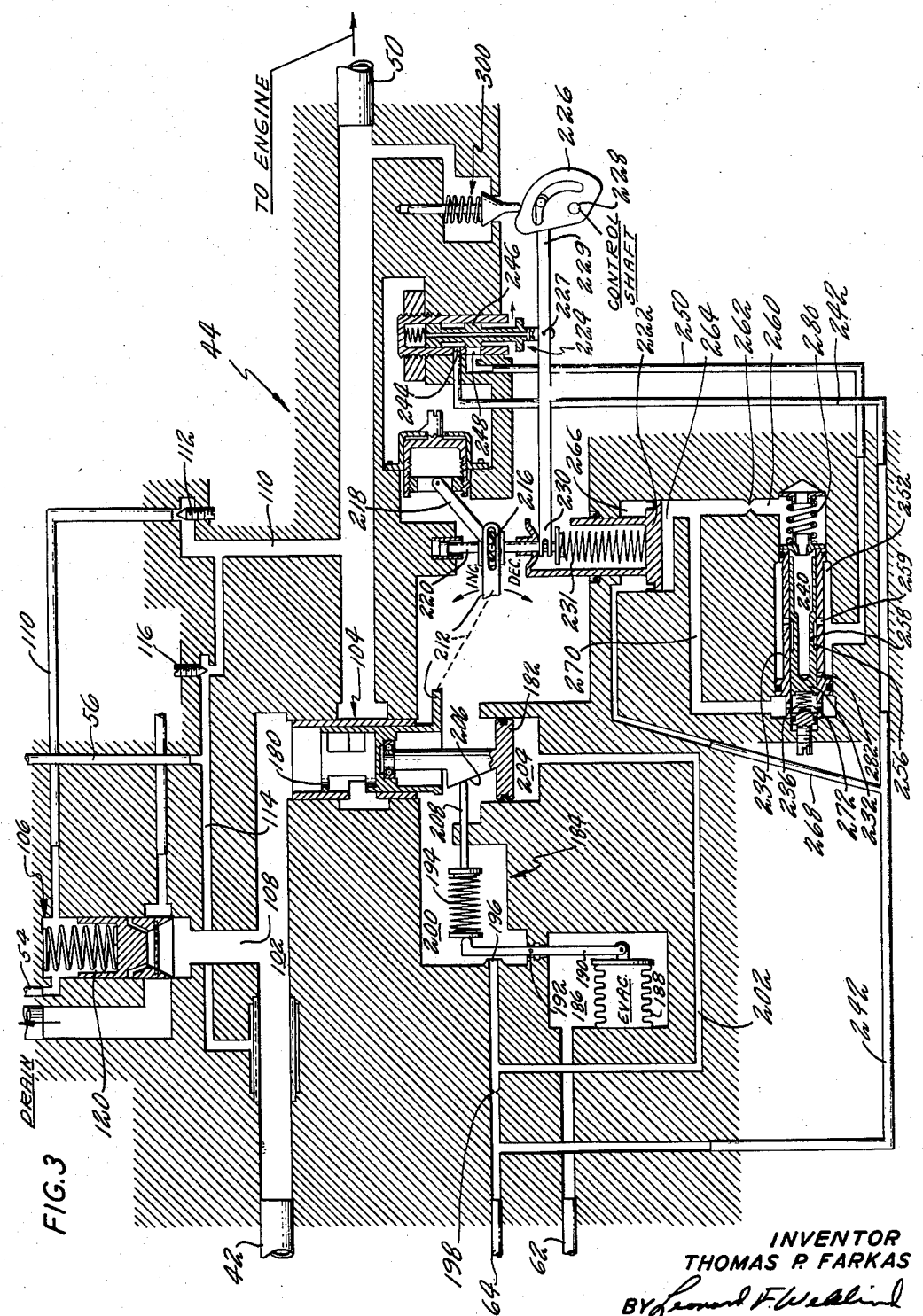
Fig. 3 is a schematic illustration of the emergency control system.

Referring to Fig. 1, a turbo type engine is generally indicated at 10 as having an inlet 12, a compressor section 14, a burner section 16, a turbine section 18 and an exhaust nozzle 20. Fuel is fed to the combustion chamber by a suitable line schematically illustrated at 22.

Fuel from a suitable source enters the line 30 and then passes through a suitable pump 32 which feeds the transfer system 34 by means of a line 36. The transfer system 34 can automatically connect the line 36 to the line 38 and the normal control 40 or the transfer system 34 can automatically connect the line 36 to the line 42 and the emergency control 44. The normal control 40 and the emergency control 44 are connected in turn to a shuttle valve 46 by means of lines 48 and 50, respectively. The shuttle valve may be of any variety as long as it automatically responds to the pressure from the operative control to shut off the flow from the other. Fuel from the shuttle valve 46 then flows to the combustion chamber 16 by means of the line 22. A topping governor system is shown by the box 60 which has fluid connections to the emergency control 44 via fluid lines 54 and 56. The topping governor 60 also has an electrical connection 58 to the transfer system 34. The emergency control box 44 also has a connection via the line 62 to the compressor inlet in order to sense the inlet pressure of the compressor or power plant. The emergency control 44 also has a continuous high pressure connection via the line 64 in order to supply the servo mechanisms of that control in a manner to be described hereinafter.

Referring to Fig. 2, the transfer system generally indicated at 34 receives fluid from the pump by means of the line 36 and this fluid then passes through a transfer valve 70. In the position shown the transfer valve 70 passes fluid to the emergency system via the line 42. When the valve 70 is moved downwardly against the pressure of the spring 72, it connects the line 36 to the line 37 leading to the normal control. It should be noted that the normal control may be of the type illustrated and described in Patent Number 2,759,549, issued August 21, 1956, to Stanley G. Best. The transfer valve 70 is positioned in its up or down position by means of a transfer solenoid 74 which opens or closes an orifice 76. By opening or closing the orifice 76 either high or relatively low pressure is established in the chamber 78 of the amplifier valve 80. Thus, a fluid under relatively high pressure is taken from the inlet line 36 through a screen 82 and then into line 84 which contains an orifice 86 whereafter the fluid may pass to the chamber 78 and through the orifice 76. The chamber 88 on the bottom side of the amplifier valve 80 contains fluid under drain pressure which communicates to a suitable source of drain fluid via lines 90 and 92. With the amplifier valve 80 in an up position as shown, high pressure fluid from the line 84 flows to the line 94 and then to a line 96 leading to a chamber 98 at the bottom of the transfer valve 70. High pressure fluid in the chamber 98 forces the transfer valve 70 into the position shown in the drawing.

When the transfer solenoid 74 is moved so that the orifice 76 is closed, pressure in the chamber 78 will be increased so that the amplifier valve 80 will be moved downward against its spring 81 whereby low pressure fluid from the line 90 can pass to the line 96 and then to the chamber 98 at the bottom of the transfer valve 70. In this position high pressure fluid from the line 36 will force the transfer valve downwardly against the spring 72 and the pressure forces at 94A and 88A thereby connecting the inlet line 36 to the normal control by means of the line 37.

The transfer solenoid 74 can be actuated automatically by means to be described hereinafter and/or by a manual switch connected to the electrical lines 170 in a suitable manner. The manual switch is omitted herein for convenience.

Referring to Fig. 3, the emergency control system of this invention is schematically illustrated. Fuel under pressure is received from the transfer system through an inlet line 42 and line 102 which leads through a window type throttle valve generally indicated at 104. The throttle valve 104 has the pressure drop thereacross regulated by a pressure regulating valve 106 which senses the pressure upstream of the throttle valve by means of a line 108 and the pressure downstream of the throttle valve by means of a line 110. For normal operation this pressure drop across the throttle valve may be fixedly adjusted by means of an adjustable orifice 112 in the line 110. A second line 114 runs parallel to the throttle valve inlet and outlet and includes an adjustable orifice 116 which controls the idle flow or minimum flow for the power plant. Normally the pressure drop across the throttle valve 104 is maintained at a predetermined value by the pressure regulator valve 106 in accordance with the adjustment of the orifice 112. However, this pressure drop may be varied by a speed topping signal which varies the pressure in a line 54 which leads from the topping governor 60. The pressure in the lines 54 and 110 control the pressure in the chamber 120 in the top of the pressure regulating valve 106.

For clarity reference may now be had also to Fig. 4 which illustrates the topping governor system. The topping governor system includes a flyweight governor 130 suitably driven from the power plant. The governor 130 has a vertical link 132 attached to a horizontal rod 134 which is pivoted at 136 and has its right-hand end 138 operating against a spring 140 to control the area of the orifice 142. The orifice 142 is fed fluid under pressure by means of a line 56. This fluid under pressure is then passed to the chamber 146 which leads to the line 54 connected to the chamber 120 at the top of the pressure regulating valve 106 (Fig. 3). At normal speeds the pressure in the chamber 120 is not affected by the topping governor system so that the pressure drop across the throttle valve remains substantially constant. However, if the engine speed exceeds the preset limit the topping governor system orifice 142 has its area reduced thereby decreasing metered flow to the chamber 146 and line 54. The pressure in chamber 120 is reduced thereby permitting the pressure regulating valve 106 to move to a more open position to bypass more fuel whereby the flow through the throttle valve 104 is correspondingly decreased. Orifice 142 in the open position is still a restriction by construction. This is done by selecting the maximum area of orifice 142 and the adjustable area of 112 in such a way as to create a restriction. Normally, the area of orifice 142 in the wide open position is two to three times greater than area of orifice 112 after proper adjustment.

Another way of illustrating the operation of the topping governor system may be made in this manner. When the topping governor reduces the opening of the orifice 142, metered flow to the adjustable orifice 112 is decreased and the pressure drop across the orifice 112 is also decreased. Since the total pressure drop across the throttle valve 104 is equal to the pressure drop across orifices 112 and 142, the pressure drop across the throttle valve 104 is similarly reduced and a corresponding decrease in fuel flow to the engine occurs. The pressure regulator 106 then actually regulates the pressure difference across the topping governor variable orifice 142 and the orifice 142 acts as a metering orifice which controls flow through the adjustable orifice 112 and the pressure drop thereacross.

The total pressure drop across the throttle valve is equal to sum of the drops across the variable orifice 142 and the fixed orifice 112. The drop across the variable orifice 142 is regulated to a constant value by the pressure regulating valve 106. The pressure drop across the fixed orifice 112 varies as the square power of the metering fuel flow through the two orifices 142, 112 or it can be said that this drop varies as the square power of the area of the variable orifice.

The total engine fuel flow (that is, the flow through the throttle valve 104) is proportional to the square root of the total pressure drop and since the total pressure drop is proportional to the square of the area of the variable orifice 142, the throttle valve 104 fuel flow is then directly proportional to the square root of the square of the area of orifice 142 plus a constant.

Now if the derivative (slope) of the engine (throttle valve) fuel flow with respect to the opening of the variable orifice 142 is taken, the resultant relationship is a constant.

Since the opening of the variable orifice 142 varies inversely with a function of engine r.p.m., the resultant relationship between fuel flow and engine speed is essentially linear. Actually the orifice area varies inversely with the square of the r.p.m. (not a true linear relationship) but since only a small portion of the curve is used, the relationship is essentially linear. This linear relationship is what is desired for properly controlling fuel flow vs. engine r.p.m. without encountering problems of instability and sluggish governing.

The topping system is claimed in copending patent application Serial No. 611,108, filed by Richard Gamble as of even date and assigned to the assignee of this invention.

The vertical link 132 which is operated by the flyweights 130 of the topping governor system includes a catch or lip element 160 which is adapted to engage one end of a horizontal link 162 pivoted at 164. The left end 166 of the horizontal link 162 is adapted to actuate a snap action switch 168. The switch 168 has its leads 58 connected to the leads 170 of the transfer solenoid 74 (Fig. 2). One of the leads 58 is a power supply while the other two connect to the solenoid. Thus, when a predetermined underspeed occurs vertical rod 132 of the topping governor has its lip 160 engage the horizontal link 162 thereby actuating the snap action switch 168. This action energizes the transfer solenoid 74 thereby automatically moving the transfer system to a position whereby the emergency fuel control system becomes operative. Thus during normal operation when a predetermined underspeed occurs the emergency fuel control system will be brought into operation.

Referring to Fig. 3, the throttle valve generally indicated at 104 is a window type valve which includes a sleeve 180 having window type ports therein. The casing surrounding the sleeve 180 includes cooperating ports. The sleeve 180 is both reciprocable and rotatable either separately or simultaneously to provide the desired fuel schedule. The valve sleeve 180 is movable vertically by means of a servo piston 182 which is actuated by a pressure sensing mechanism generally indicated at 184. The pressure sensing system 184 receives fluid under pressure from the compressor inlet via the line 62. This pressure is brought into a chamber 186 which surrounds an evacuated bellows 188. Variations in inlet air pressure will expand or contract the bellows 188 thereby moving the rod 190 about its pivot 192. The rod 190 at its upper end engages a spring 194 and is intended to vary the area of the orifice 196. Fluid under high pressure enters at line 64, passes through an orifice 198 and then is discharged through the orifice 196 into the chamber 200 which is at some low pressure such as drain. After the fluid under pressure passes the fixed orifice 198 it is allowed to flow into a line 202 leading to the chamber 204 at the bottom of the servo piston 182. It is thus seen that any variation in the area of the variable area orifice 196 will vary the pressure in the line 202 and the chamber 204 to position the servo piston 182. The servo piston 182 includes a cam 206 and a cam follower 208 thereby varying the compression of the spring 194. Thus a force feedback is provided in the servo system which vertically moves the throttle valve sleeve 180. The throttle valve sleeve 180 includes a depending arm 212 whereby the sleeve may be rotated about the vertical axis of the throttle valve 104.

Thus the depending arm 212 has a slot therein which engages a pin 216 carried by an adjusting arm 218. The adjusting arm 218 is movable by an adjusting screw 219 which varies the distance of the pin 216 from the center or axis of rotation of the valve sleeve 180. With the arm 218 carrying pin 216 the maximum rotation of the valve sleeve 180 is established.

Figure 5:
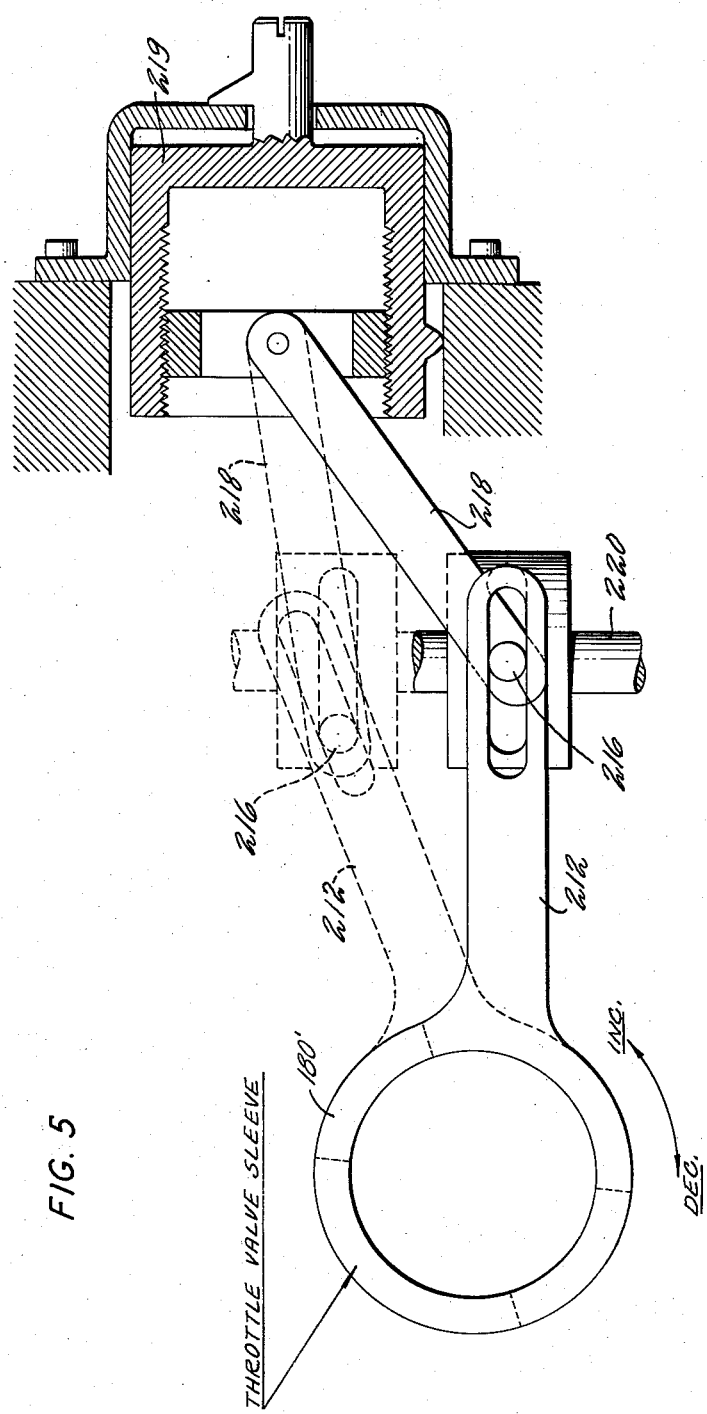
Fig. 5 is a schematic illustration of the positions of the throttle valve sleeve linkage.

As shown in Fig. 5 the member 212 and member 220 each carry cooperating slots which also engage with pin 216. It can be seen that with screw 219 adjusted such that its follower 221 is moved toward the left, the pin 216, being confined in the slot in member 220, will permit an increased upward movement of the member 212 for a given upward movement of 220. In other words, by rotation of screw 219, pin 216 can be moved to the left through link 218. This allows for further rotation of sleeve 180' and a higher maximum fuel flow. The slots are shown in three operative positions of the sleeve 180' and members 216 and 220. Pin 216 is restrained within the slot in member 220 such that pin 216 is always perpendicular to the axis of member 220. Therefore, rotation of screw 219 cannot cause link 218 to rotate.

It is of course important here that the alignment of the slots be such that the position of member 212 remains independent of the adjustment of 219 when the former is in the minimum fuel flow position. The slots in 212 and 220 are mated such that adjustment of screw 219, while causing linear displacement of pin 216, does not cause angular displacement of throttle valve sleeve 212.

The provision of this single adjustment which is capable of independently altering the maximum fuel flow lines or schedules is of utmost importance since it provides ease of adjustment in the field. The field maintenance technician need merely place the power lever in the minimum fuel flow position, make any other adjustments necessary, then place the power lever in the maximum fuel flow position and accomplish the temperature adjustment on the maximum fuel flow line or schedule. In other words the maximum fuel flow is adjusted for local ambient temperatures. By contrast, with a control incorporating interdependent adjustments it is necessary to use trial and error combinations of the two or more adjustments to accomplish the desired result.

The adjustment feature is claimed in copending patent application Serial No. 611,109 filed by Robert D. Porter as of even date and assigned to the assignee of this invention.

The pin 216 also connects with the vertical arm 220 which is moved by a servo piston 222. The servo piston 222 is intended to move the arm 220 and also the depending arm 212 of the throttle valve sleeve 180. The servo piston 222 is positioned in response to a signal received from a servo control valve 224 which in turn is operated by a cam 226 moved in response to operation of the pilot's control lever. The pilot's control lever is suitably connected to the control shaft 228. The cam 226 is connected to the right-hand end of a bar 229 pivoted intermediate its ends at 227 and this bar has its left end 230 operatively connected to the vertical member 220 and engaging the spring 231.

A hydraulic system is interposed between the servo control valve 224 and the servo piston 222 in order to provide for a controlled rate of fuel flow increase and a more rapid rate of fuel flow decrease in response to operation of the pilot's control lever. To this end a time delay regulator system is provided. This regulator system includes a valve having a piston 232 slidable in a sleeve 234 and urged to the right by a spring 236. A control chamber 240 is provided centrally of the piston 232 which receives fluid under suitable control pressure from the control valve 224.

High pressure fluid is directed to the control valve 224 by means of a line 242 to a port 244 at the control valve 224. When the valve stem 246 of the control valve 224 is moved downwardly, high pressure fluid from the port 244 is then conducted to the port 248 whereby it flows into the line 250 then to the chamber 252 of the regulator valve. From chamber 252 the fluid may pass to the port 259, annulus 256, port 258 and then to the chamber 240 within the valve piston 232. Under these conditions fluid under high pressure then flows to the right side of the valve into line 260 past a fixed orifice 262 and then to the chamber 264 on the bottom side of the servo piston 222. It should be noted that the chamber 266 on the top side of the servo piston 222 is continuously exposed to high pressure fluid from a line 268 leading from the line 242.

In passing the orifice 262 a pressure drop will be created whereby a slightly lower pressure occurs in the chamber 264 as well as the passage 270 which leads around to the left-hand side of the regulator valve piston 232. From the line 270 fluid can then enter a chamber 272 whereby pressure is exerted tending to move the valve piston 232 toward the right. Pressure in the chamber 272 in urging the piston 232 toward the right acts to permit further flow of high pressure fluid to chamber 240 and the line 260. If, for example, a pressure drop across the orifice 262 is 10 p.s.i. with a given supply pressure to the line 250 and the pressure in line 250 is suddenly increased, piston 232 will be urged to the left against the pressure of spring 236 tending to close off port 259 thereby decreasing the pressure in chamber 240 until it reaches a value 10 p.s.i. higher than that of the pressure in chamber 272. Following this piston 232 will again move sufficiently to the right allowing the flow to continue through the port 259, annulus 256, port 258, chamber 240, line 260 and the chamber 264 at the bottom of the servo piston 222. Stated another way, if for example, control valve 224 is displaced downward causing supply pressure from line 242 to be directed to line 260 through chamber 252, port 259, port 258, and chamber 240, the pressure drop across orifice 262 will exceed the pressure setting of spring 236 causing piston 232, the opposite ends of which are exposed to the pressures in lines 260 and 270, to move to the left thereby reducing the area of port 259 with the attendant effect of throttling the flow from line 250 to line 260 until the pressure in line 260 exceeds the pressure in line 270 by the amount of the pressure setting of spring 236. With a given value of pressure drop across the orifice 262 it is then possible to establish the rate at which the servo piston 222 will move in an upward or increased fuel flow direction.

When the control valve 224 is moved in an upward direction, the port 248 is connected with drain so that flow in the line 250 is then reversed. This flow reversal begins at the chamber 264 at the bottom of the servo piston 222 so that the fluid attempts to flow downwardly in line 260 past the restriction 262 and into the chamber 240 of the piston 232. With a flow in this direction there is a pressure drop across the restriction 262 whereby the pressure in the line 270 and the chamber 272 at the left-hand side on the piston 232 is higher than the pressure in the chamber 240. This urges the piston 232 to the right against the action of the spring 280 which is located at the right-hand side of the valve piston 232. As the piston 232 moves to the right, it opens port 282 thereby opening chamber 272 to the line 250 and drain. Fluid may now flow rapidly from the chamber 264 at the bottom of the servo piston 222 via the line 270, chamber 272, port 282 and then to the line 250. Thus, the restriction 262 is bypassed and the servo piston 222 can move down rapidly. As the servo piston 222 reaches its downward limit, the pressure in the chamber 264, line 270 and chamber 272 will reduce thereby permitting the piston 232 to move back toward the left to a neutral position.

Considering now the relationship of the time delay servo with the control valve 224 and other system elements, it will be noted that the lever 229 is positioned at one end by the control shaft cam 226 and at its other end 230 by spring 231 which preloads it against servo piston 222. The spring 231 which engages the left end 230 of the lever 229 is incorporated to insure the ability of the system to decrease fuel flow in case of sticking of the servo piston 222. In this event, pilot valve 224 bottoms against its sleeve to act as a fulcrum for lever 229 permitting cam 226 to move the left end 230 of lever 229 downward thus freeing lever 230 from the stuck piston 222 and also causing the throttle valve to move in the decreasing fuel flow direction.

In summary then the throttle valve is positioned in accordance with compressor inlet pressure and the pilot's power lever position. However, with the time delay servo the throttle valve will be moved to increase fuel flow at a given rate for power lever increase so that in case of a sudden increase fuel flow movement of the power lever an excessive rate of increase in fuel flow is avoided. On the other hand when the power lever is moved toward decrease fuel flow the throttle valve and its servo are moved rapidly toward decrease fuel flow.

Thus if the pilot moved his power lever to the 100% setting, then suddenly reducing the setting to 50% power and then again returned the power lever to the 100% setting rapidly, the fuel flow rate would immediately jump to the 100% setting if downward movement of the throttle servo piston 222 were very slow. For the instant when the power lever called for 50% power the throttle valve would be set for such a flow through the action of the override spring 231, but when the power lever is pushed up to the 100% setting the throttle rotating servo piston 222, having already been at a high level from the previous 100% setting and having remained there due to its slow action during the decrease in power lever setting would allow the throttle valve to immediately pass the 100% fuel flow position. The delay feature would thus be ineffective during this type of operation. With rapid downward movement of the throttle valve servo piston 222 this undesirable feature is eliminated.

A windmill by-pass valve 300 is provided between the throttle valve 104 and the engine. The by-pass valve 300 is controlled by the power lever or control cam 226 so that in the off position or near-off position of the control lever a certain amount of fuel will be by-passed and prevented from passing to the power plant.

The bypass valve acts to allow a complete shut-off of fuel flow to the engine combustion chamber. Located downstream of the bypass is a nozzle pressurizing valve (not shown) which remains open as long as fuel pressure exceeds a preset limit. Without this bypass provision fuel flow through the throttle valve line and leakage through the throttle valve would quite likely be sufficient to cause the pressurizing valve to remain open, thus passing unneeded fuel to the engine. The bypass valve by dumping flow from these two sources lowers the pressure acting on the pressurizing valve and thereby allows shut-off of the emergency control.

As a result of this invention, it is apparent that an improved fuel control system as well as an emergency control has been provided. Furthermore, the control system includes certain novel operating features as described hereinabove.

Although only one embodiment of this invention has been illustrated and described herein, it will become apparent that various changes and modifications may be made in the construction and arrangement of the various parts without departing from the scope of this novel concept.

What it is desired by Letters Patent is:

1. In a fuel control for a turbine type power plant, said control having a fuel regulating means, a power lever, means responsive to a pressure of the gases in the power plant and the setting of said lever for generating signals which is a function of the value of said pressure and said setting, a servo device for transmitting each of said signals, means for receiving said signals and controlling said regulating means, and means for modifying the effect of the signal which is a function to said setting including a time delay device for varying the speed of operation of the associated servo device.

2. In a fuel control for a turbine type power plant, said control having a fuel regulating means, a power lever, means responsive to a pressure of the gases flowing in the power plant and the setting of said lever for generating signals proportional to the value of said pressure and said setting, a servo device for transmitting each of said signals, means for receiving said signals and controlling said regulating means, means for modifying the effect of the signal proportional to said setting including a time delay device for varying the speed of operation of the associated servo device, means for controlling the pressure drop across said main fuel regulating means, and means responsive to an operative variable of power plant operation exceeding a predetermined value for varying the operation of said pressure drop controlling means.

3. In a fuel control for a turbine type power plant, said control having a fuel regulating means, a power lever, means responsive to a pressure of the gases flowing at one point in the power plant and the setting of said lever for generating signals proportional to the value of said pressure and said setting, a control valve for transmitting each of said signals, a fluid servo device operated by each of said control valves including a separate feed-back connection between each said valve and its respective servo device, means for connecting said servo devices to said regulating means, and means for modifying the effect of the servo whose position is proportional to said setting including a time delay device for varying the speed of operation of said servo device.

4. In a fuel control for a turbine type power plant, said control having a fuel regulating means, a power lever, means responsive to a pressure of the gases flowing at one point in the power plant and the setting of said lever for generating signals proportional to the value of said pressure and said setting, a control valve for transmitting each of said signals, a fluid servo device operated by each of said control valves, including a separate feed-back connection between each said valve and its respective servo device, means for connecting said servo devices to said regulating means, and means for modifying the effect of the servo whose position is proportional to said power lever setting including a time delay device for varying the speed of operation of said servo device, said time delay device including a restriction and a valve for by-passing fluid around said restriction dependent upon the direction of flow therethrough.

References Cited in the file of this patent

UNITED STATES PATENTS

| | | |
|---|---|---|
| 1,467,522 | Ansler | Sept. 11, 1923 |
| 1,972,462 | Schafer | Sept. 4, 1934 |
| 2,151,057 | Suth | Mar. 21, 1939 |
| 2,596,815 | Keil | May 13, 1952 |
| 2,639,584 | Schorn | May 26, 1953 |
| 2,669,094 | Lee | Feb. 16, 1954 |
| 2,674,847 | Davies et al. | Apr. 13, 1954 |
| 2,675,674 | Lee | Apr. 20, 1954 |
| 2,691,268 | Prentiss | Oct. 12, 1954 |
| 2,708,826 | Torell | May 24, 1955 |
| 2,737,015 | Wright | Mar. 6, 1956 |

FOREIGN PATENTS

| | | |
|---|---|---|
| 508,663 | Canada | Dec. 28, 1954 |
| 585,032 | Great Britain | Jan. 29, 1947 |